(12) United States Patent
Hayashi

(10) Patent No.: US 6,823,974 B2
(45) Date of Patent: Nov. 30, 2004

(54) ELECTROMAGNETIC CLUTCH

(75) Inventor: Toshihiro Hayashi, Chiryu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/359,637

(22) Filed: Feb. 7, 2003

(65) Prior Publication Data
US 2003/0159901 A1 Aug. 28, 2003

(30) Foreign Application Priority Data

Feb. 26, 2002 (JP) ........................................ 2002-049581

(51) Int. Cl.⁷ ............................................. F16D 27/00
(52) U.S. Cl. ................................ 192/84.961; 192/30 V; 192/84.941; 192/209
(58) Field of Search ........................ 192/84.961, 84.941, 192/200, 209, 55.3, 30 V

(56) References Cited

U.S. PATENT DOCUMENTS

| | | | | |
|---|---|---|---|---|
| 4,445,606 A | * | 5/1984 | Van Laningham | 192/209 |
| 4,493,407 A | * | 1/1985 | Newton | 192/84.941 |
| 4,793,455 A | * | 12/1988 | Tabuchi et al. | 192/84.941 |
| 4,828,090 A | * | 5/1989 | Matsushita | 192/84.941 |
| 4,860,867 A | * | 8/1989 | Nishimura | 192/84.941 |
| 5,036,964 A | * | 8/1991 | Booth et al. | 192/84.5 |
| 5,601,168 A | * | 2/1997 | Hayashi et al. | 192/55.6 |
| 5,632,366 A | * | 5/1997 | Mullaney | 192/84.1 |
| 5,642,798 A | * | 7/1997 | Muirhead et al. | 192/84.961 |
| 5,692,591 A | * | 12/1997 | Kimura | 192/84.941 |
| 6,193,040 B1 | * | 2/2001 | Cerny | 192/84.961 |
| 6,286,650 B1 | | 9/2001 | Tabuchi et al. | |
| 6,578,688 B2 | * | 6/2003 | Muirhead et al. | 192/84.941 |

* cited by examiner

Primary Examiner—Saul Rodriguez
(74) Attorney, Agent, or Firm—Posz & Bethards, PLC

(57) ABSTRACT

An electromagnetic clutch reduces clutch operating noise at a low cost by utilizing elastic members which are suited to a spring force of a leaf spring. An approximate nonagonal leaf spring has an outer ring portion, attachment portions connected to a hub, and connecting portions. Under the outer ring portion, securing portions of an armature are disposed. First elastic members are disposed at intermediate points of the securing portions, and a second elastic member is disposed in a gap between the leaf spring and the hub along an axial direction. When actuating the electromagnetic clutch, the leaf spring compresses the second elastic member, and when stopping the electromagnetic clutch, the armature collides with the first elastic member so that an axial position of the armature is secured.

16 Claims, 10 Drawing Sheets

FIG. 13
FIG. 14
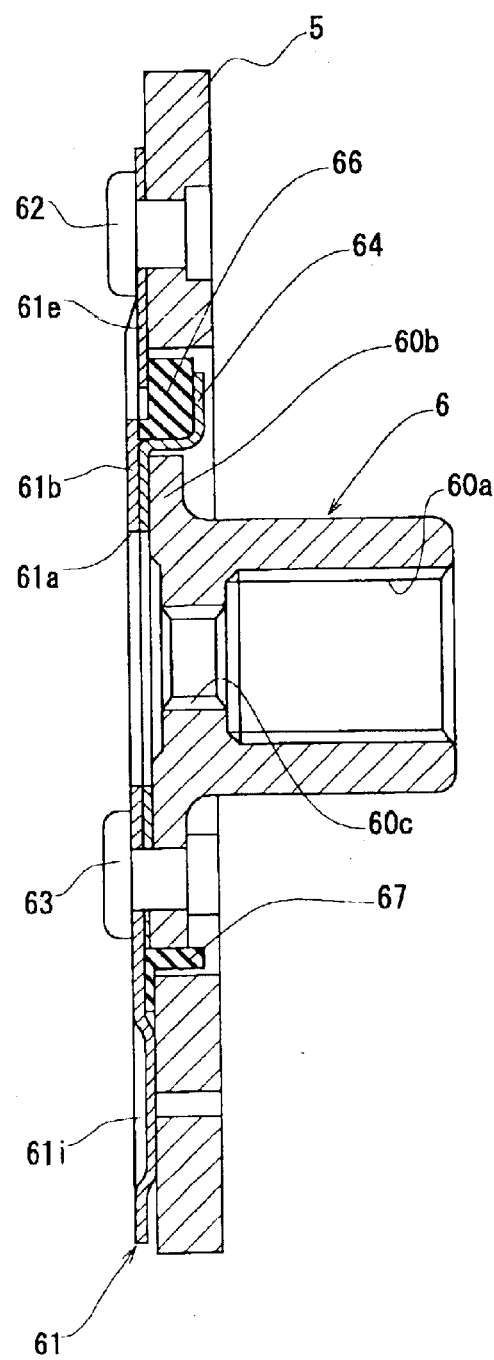
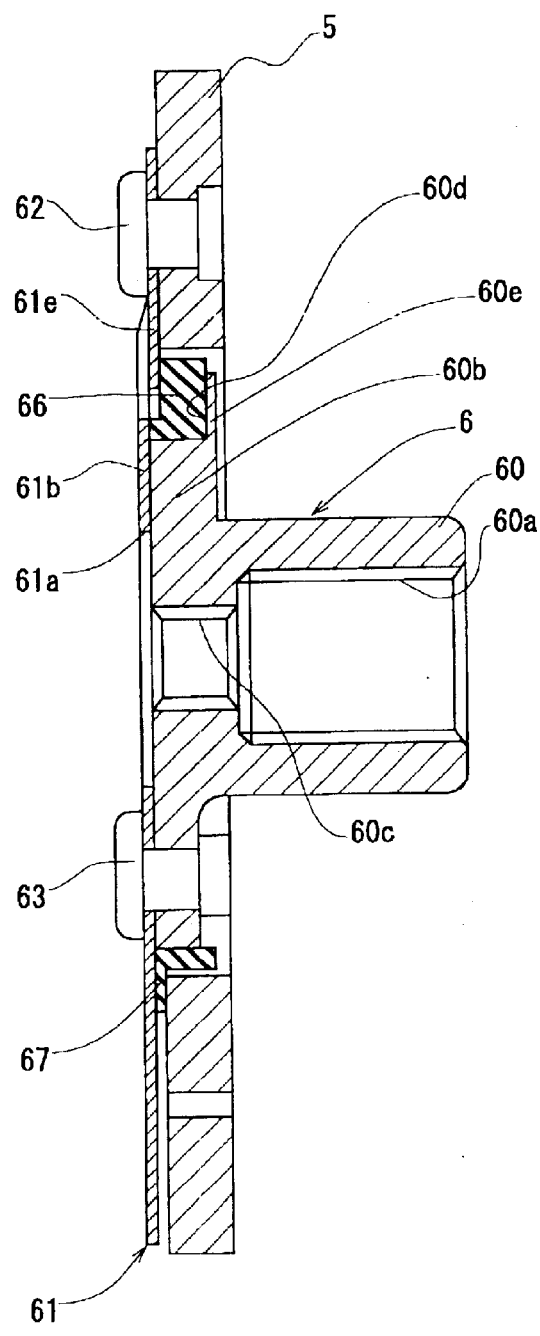

ELECTROMAGNETIC CLUTCH

CROSS REFERENCE TO RELATED APPLICATION

This application is based upon, claims the benefit of priority of, and incorporates by reference the contents of prior Japanese Patent Application No. 2002-49681 filed Feb. 26, 2002.

BACKGROUND OF THE INVENTION

1. Field of the Invention

The present invention relates to an electromagnetic clutch that transmits and terminates rotational power, and particularly, the present invention relates to a reduction in clutch operating noise generated when the electromagnetic clutch actuates and stops.

2. Description of Related Art

One type of known electromagnetic clutch is disclosed in Japanese Patent Laid-Open Publication No. 2000-179582. The patent application is composed of an armature attracted to a drive-side rotation member by an electromagnetic force generated by an electromagnetic coil, a driven-side rotation member connected to a driven-side rotation device, and a plate of ring-shaped leaf springs, as a spring means, connecting the armature to the driven-side rotation member.

The ring-shaped leaf spring comprises an outer ring portion connected to the armature, an attachment portion disposed inside the outer ring portion and connected to the driven-side rotation member, connecting portions connecting between the outer ring portion and the attachment portion, securing portions of the armature disposed in a plurality of positions of the outer ring portion in a circumferential direction, and a deflection adding portion for providing an initial deflection to the ring-shaped leaf spring. The deflection adding portion is arranged between the plural positions of the outer ring portion in the circumferential direction so that it acts to shorten an axial dimension of the electromagnetic clutch and to simplify the overall configuration.

Using the ring-shaped leaf spring in the above-mentioned configuration, since a spring force which increases non-linearly and rapidly relative to a displacement amount of the armature restricts movement of the armature just before the armature collides with the drive-side rotation member, a collision force of the armature with the drive-side rotation member is reduced to reduce the operating noise of the electromagnetic clutch.

In order to further reduce the operating noise of the electromagnetic clutch, there is an extending portion inwardly extending an arm portion, which is a securing portion disposed in the outer ring portion of the ring-shaped leaf spring to secure the leaf spring to the armature, and an elastic member disposed in an opposite position to the extending portion of the arm portion. Thus, when the electromagnetic clutch is ON, that is, when the electromagnetic force generated by the electromagnetic coil attracts the armature toward the drive-side rotation member, the elastic member is elastically compressed in a relative fashion to increase a displacement amount of the arm portion, so that the elastic member alleviates an impact of attraction of the armature to the drive-side rotation member and further reduces the clutch operating noise.

The above-mentioned leaf spring functions as a spring when the outer ring portion secured to the armature is elastically deformed. However, there is a problem in which the ring-shaped leaf spring disclosed in the above publication does not have enough compressive force to deform the elastic member, because a length from the securing portion of the armature to the extending portion of the arm portion is long and the arm portion has a large deflection. For the sake of shortening the length of the arm portion, another securing portion may be disposed inwardly, but an increase in the number of the securing portion causes additional cost because of extra connecting means like rivets.

A plurality of three arm portions are provided in a circumferential direction of the leaf spring, and an elastic member is opposed to each arm portion. Thus, there is a problem in which the electromagnetic clutch needs a large number of parts and a large number of man-hours. Furthermore, the elastic member reduces the clutch operating noise only when the electromagnetic clutch is ON. It is necessary to reduce the operating noise when the electromagnetic clutch is OFF and the armature attracted to the drive-side rotation member is separated therefrom and returns to its original position.

In view of the above fact, an object of the present invention is to provide an electromagnetic clutch whose operating noise can be reduced at a low cost by using an elastic member which is better suited to a spring force of an attracted and separated leaf spring.

SUMMARY OF THE INVENTION

According to a first aspect of the present invention, an electromagnetic clutch comprises an electromagnetic coil (3) for generating an electromagnetic force when being energized, a drive-side rotation member (4) rotated by a driving source, an armature (5) attracted to the drive-side rotation member (4) in response to the electromagnetic force generated by the electromagnetic coil (3) to receive rotation of the drive-side rotation member (4), a driven-side rotation member (6) connected to a driven-side device (7), and a spring means (61). The spring means (61) couples the armature (5) to the driven-side rotation member (6) and supports the armature (5) such that the armature (5) is capable of being displaced toward the drive-side rotation member (4).

The electromagnetic clutch has a spring means (61) composed of a plate of a polygonal leaf spring (61). The leaf spring (61) comprises an outer ring portion (61c) connected to the armature (5), an attachment portion (61b) positioned inside the outer ring portion (61c) and connected to the driven-side rotation member (6). A connecting portion (61d) that connects between the outer ring portion (61c) and the attachment portion (61b), and a plurality of securing portions (62) of the armature (5) are disposed in a circumferential direction of the outer ring portion (61c). A plurality of first elastic members (67) are disposed at intermediate points of the plurality of securing portions (62) in the circumferential direction (around) of the outer ring portion (61c) to give an initial deflection to the leaf spring (61).

A second elastic member (66) is disposed between the leaf spring (61) and the drive-side rotation member (4) in an axial direction. The second elastic member (66) is elastically deformed between the leaf spring (61) and the driven-side rotation member (6) when the electromagnetic force generated by the electromagnetic coil (3) displaces the armature (5) toward the drive-side rotation member (4) in an axial direction and the armature (5) collides with the first elastic portions (67) to determine its axial position when the electromagnetic coil (3) is unenergized and the armature (5)

is separated from the drive-side rotation member (4) to return to an original position.

According to the above aspect of the invention, when the clutch is actuated, namely when the leaf spring (61) connected to the armature (5) is displaced in the axial direction to the drive-side rotation member (4), the second elastic member (66) is elastically compressed between the leaf spring (61) and the driven-side rotation member (6) so that an elastic reaction force is generated in the second elastic member (66) in response to an increase in a displacement amount of the leaf spring (61). Since this elastic reaction force rapidly increases just before the armature (5) is attracted to the drive-side rotation member (4), the rapid increase in the elastic reaction force of the second elastic member (66) alleviates an impact produced when the armature (5) is attracted to the drive-side rotation member (4), and effects further reduction in the clutch operating noise.

On the other hand, when the clutch is OFF, namely when the armature (5) returns to the original, separate position by a spring force of the leaf spring (61), the armature (5) collides with the first elastic members (67) and determines an axial position thereof so that damping of the leaf spring (61) itself is alleviated and the clutch operating noise is reduced.

According to a second aspect of the invention the leaf spring (61) has the attachment portion (61b) formed in an approximate triangular shape, and has the connecting portions (61d) in the vicinity of the apexes of the triangular shape to connect with the outer ring portion (61c). The outer ring portion (61c) connected to the connecting portions (61d) is so formed in a polygonal shape as to have the largest outer dimensions.

According to the above second aspect, the leaf spring (61) of the present invention performs its spring function when the outer ring portion (61c) is connected to the armature (5) and the connecting portions (61d) are elastically deformed. Since the leaf spring (61) is formed in a polygonal shape in order to make an outer dimension of the outer ring portion (61c) connected to the connecting portions (61d) largest in size, the outer ring portion (61c) is large in size and a distance between fulcrums of the spring (spans) increases. Therefore, it is possible to reduce the spring force which is necessary to displace the armature (5) a predetermined amount.

According to a third aspect of the invention the leaf spring (61) is provided with arm portions (61e) inwardly extending from the outer ring portion (61c) in the vicinity of the securing portions (62). The second elastic member (66) is elastically deformed between the arm portions (61e) and the driven-side rotation member (6).

According to the third aspect, the arm portions (61e) for compressing the second elastic member (66) are provided in the vicinity of the plurality of securing portions (62) connected to the armature (5), so that the spring force is certainly transmitted from the securing portions (62) to the arm portions (61e) and the compressive force for compressing the second elastic member (66) increases. Thus, the clutch operating noise is reduced.

According to a fourth aspect of the invention, a length of the arm portion (61e) from the securing portion (62) to a tip of the arm portion (61e) is shorter than a predetermined length. According to the fourth aspect of the invention, an alleviation effect of the clutch operating noise depends on the compressive force of the arm portions (61e). Thus, restriction of the length from the securing portion (62) to a tip of the arm portion (61e) reduces the clutch operating noise. If the length exceeds the predetermined one, deflection of the arm portion (61e) increases, so the compressive force is not properly exerted.

According to a fifth aspect of the invention, the armature (5) is formed in an approximate ring shape, and the plurality of securing portions (62) are disposed at the approximate center of a radial width of the armature (5). Additionally, since the securing portions (62) are disposed at the approximate center of a radial width of the armature (5), the displacement amount of the armature (5) attracted to and separated from the drive-side rotation member (4) is certainly transmitted to the leaf spring (61). Therefore, it is possible to efficiently exert the electromagnetic force.

According to a sixth aspect of the invention, the second elastic member (66) with a plurality of approximate D-shaped elastic portions (66a) is so integrally formed as to be fitted in an outer periphery of the attachment flange (60b), and the second elastic member (66) disposed between the arm portions (61e) and the driven-side rotation member (6) is elastically deformed. Continuing, the integrally formed second elastic member (66) reduces the number of parts and the number of man-hours for related attachment processes, and results in a cost reduction.

According to a seventh aspect of the invention, the second elastic member (66) is integrally formed with the first elastic members (67) which are disposed at intermediate points of the elastic portions (66a) in the circumferential direction (around) and give an initial deflection to the leaf spring (61). Continuing with the seventh aspect, the first elastic members (67) integrally formed in the second elastic member (66) further reduce the number of parts and the number of man-hours for the attachment processes, and result in a cost reduction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and the accompanying drawings, wherein:

FIG. 13 is a longitudinal cross-sectional view showing the whole configuration of the hub shown in FIG. 12; and FIG. 14 is a longitudinal cross-sectional view showing the whole configuration of the hub according to another embodiment.

DETAILED DESCRIPTION OF THE PREFERRED EMBODIMENTS

The following description of the preferred embodiment(s) is merely exemplary in nature and is in no way intended to limit the invention, its application, or uses.

(First Embodiment)

Figure 1:
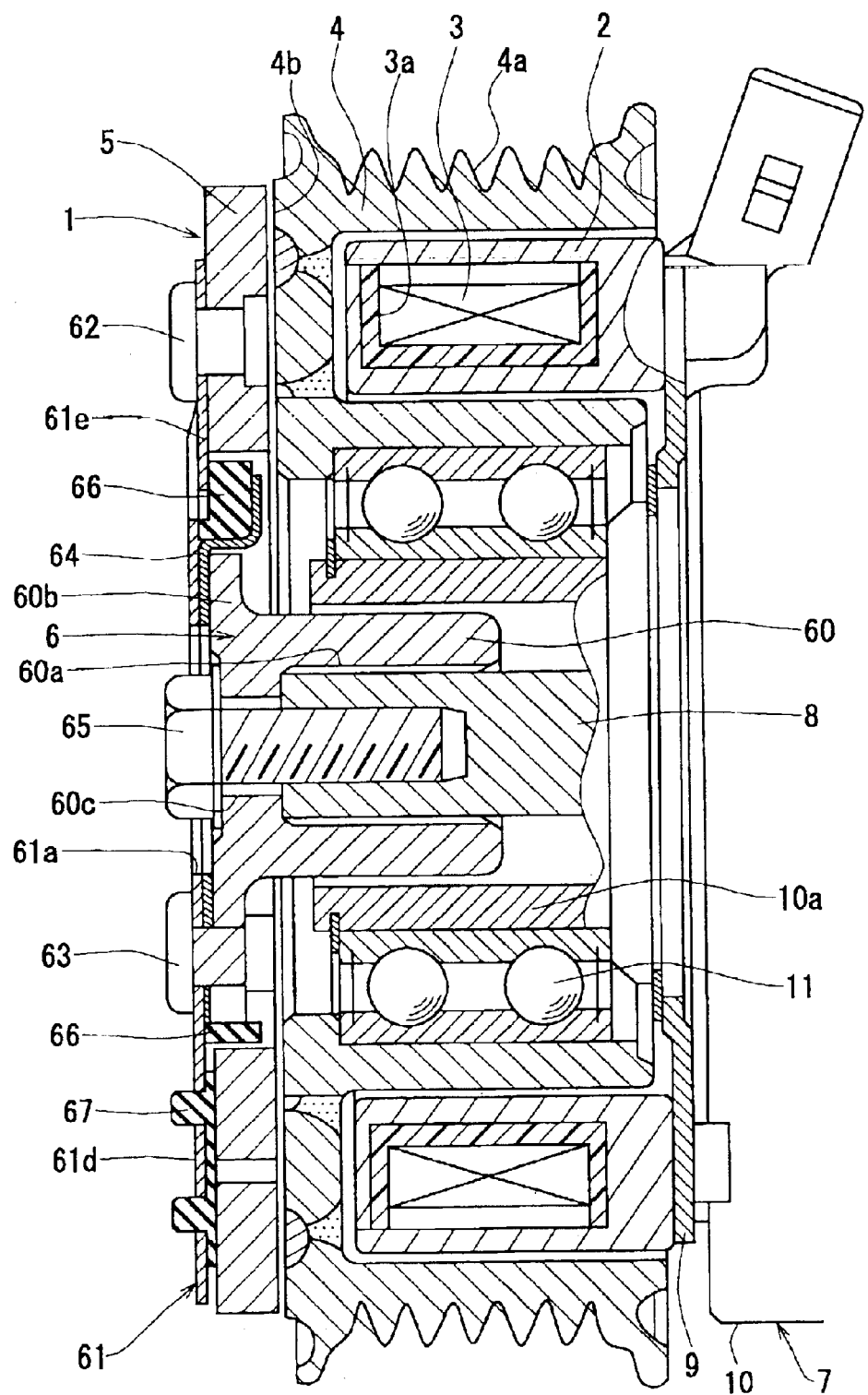
FIG. 1 is a longitudinal cross-sectional view showing the whole configuration of an electromagnetic clutch 1 according to a first embodiment of the present invention.
Figure 2:
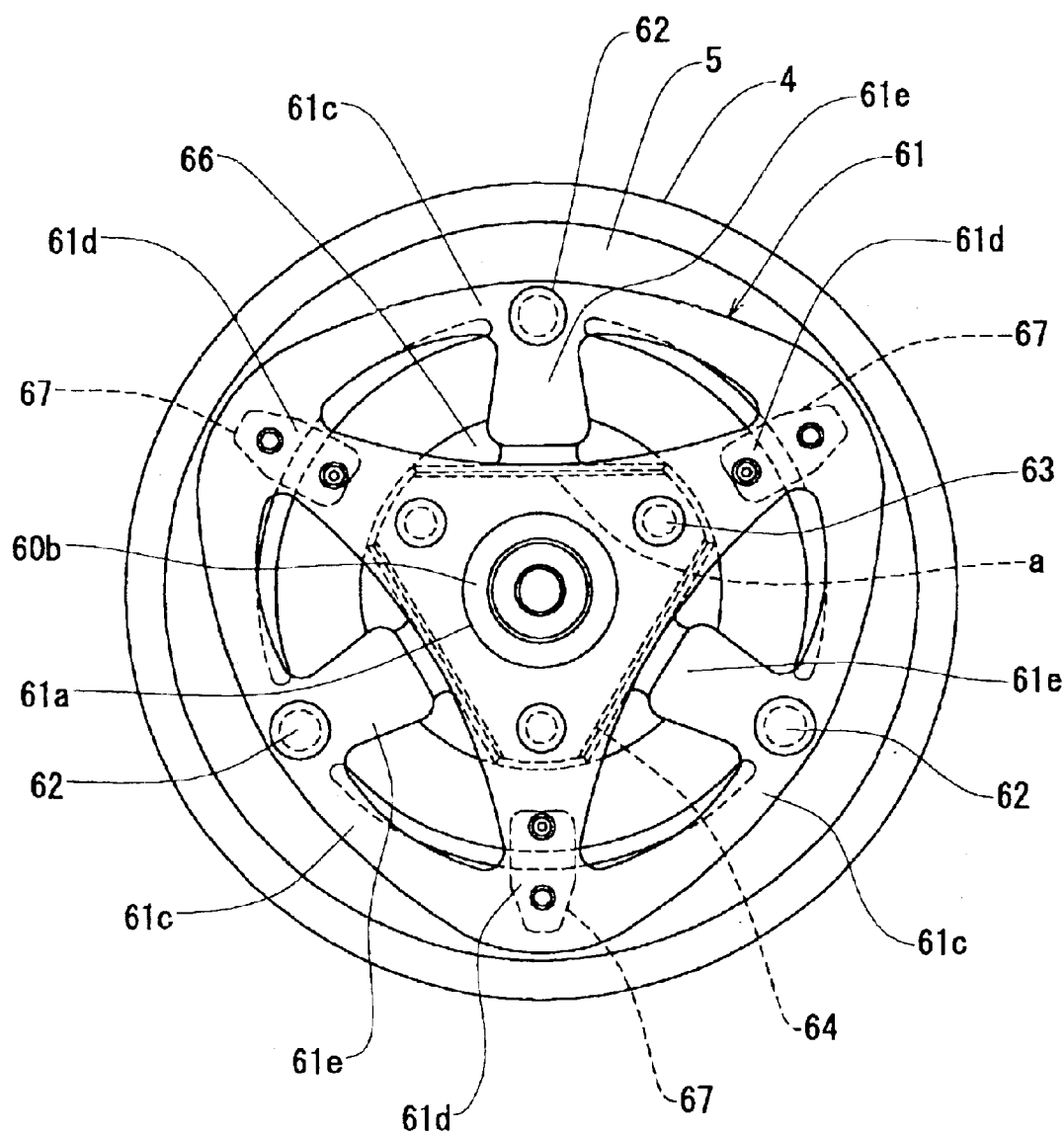
FIG. 2 is a front view of the electromagnetic clutch 1 showing a condition in which a refrigerant compressor 7 is detached from the electromagnetic clutch 1.
Figure 3:
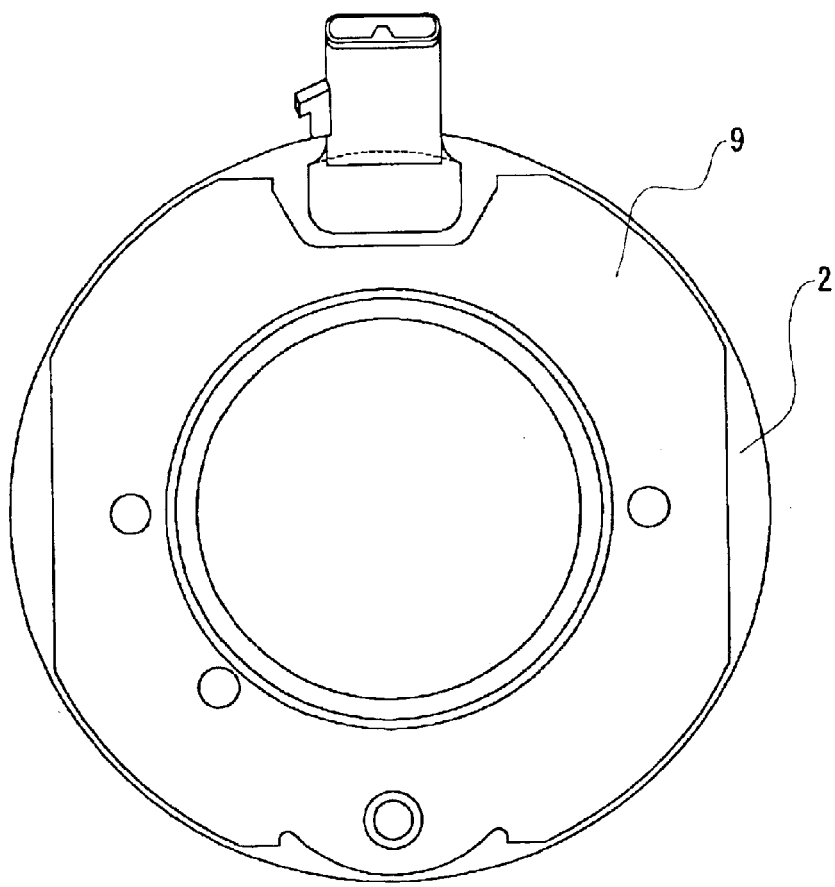
FIG. 3 is a rear view showing a stator 2 in the electromagnetic clutch 1 shown in FIG. 1.

An electromagnetic clutch according to a first embodiment of the present invention will be described hereinafter with reference to FIGS. 1 through 8. FIG. 1 is a longitudinal cross-sectional view of an electromagnetic clutch 1 provided in a refrigerant compressor 7 of a refrigeration cycle for an automobile air conditioning apparatus. FIG. 2 is a front view of the electromagnetic clutch 1 viewed from a left side in FIG. 1, and FIG. 3 is a rear view of a stator 2 viewed from a right side in FIG. 1. FIG. 2 omits a coupling portion of a bolt 65 shown in FIG. 1.

Figure 5:
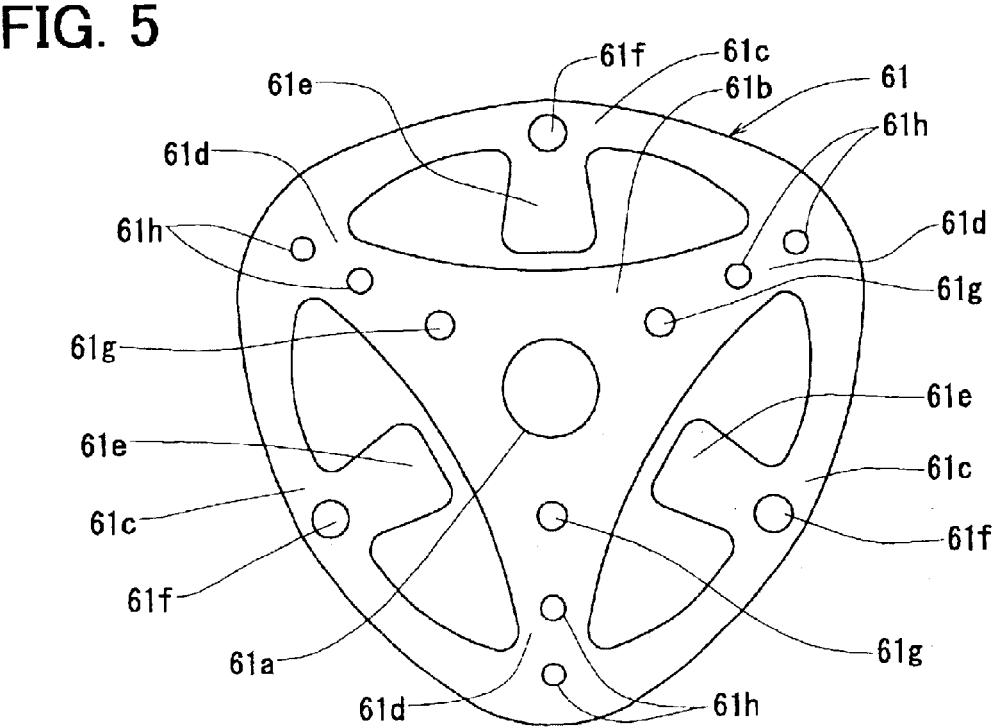
FIG. 5 is a front view showing the shape of a leaf spring 61 according to the first embodiment of the present invention.
Figure 4:
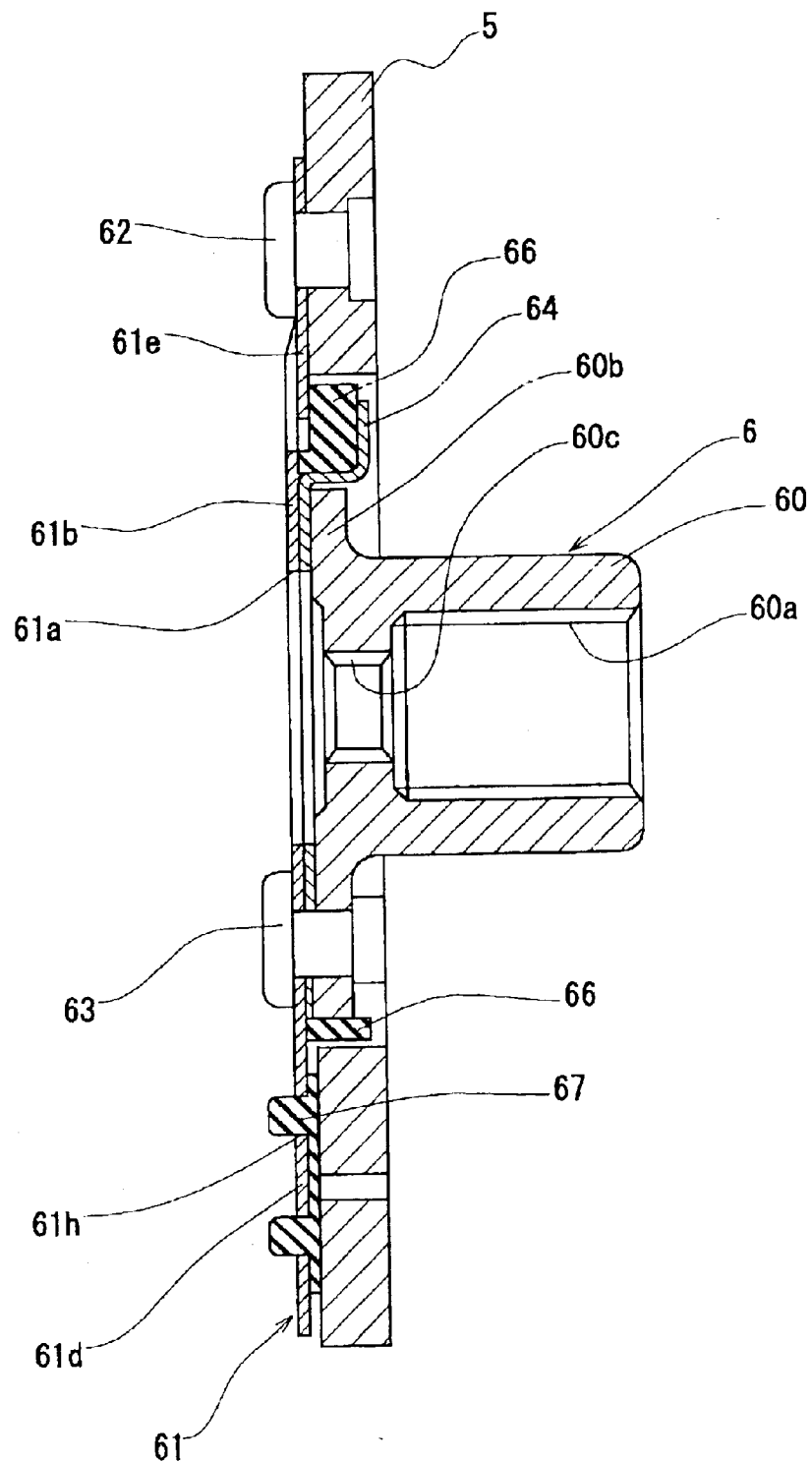
FIG. 4 is a longitudinal cross-sectional view showing the whole configuration of a hub according to the first embodiment of the present invention.
Figure 6:
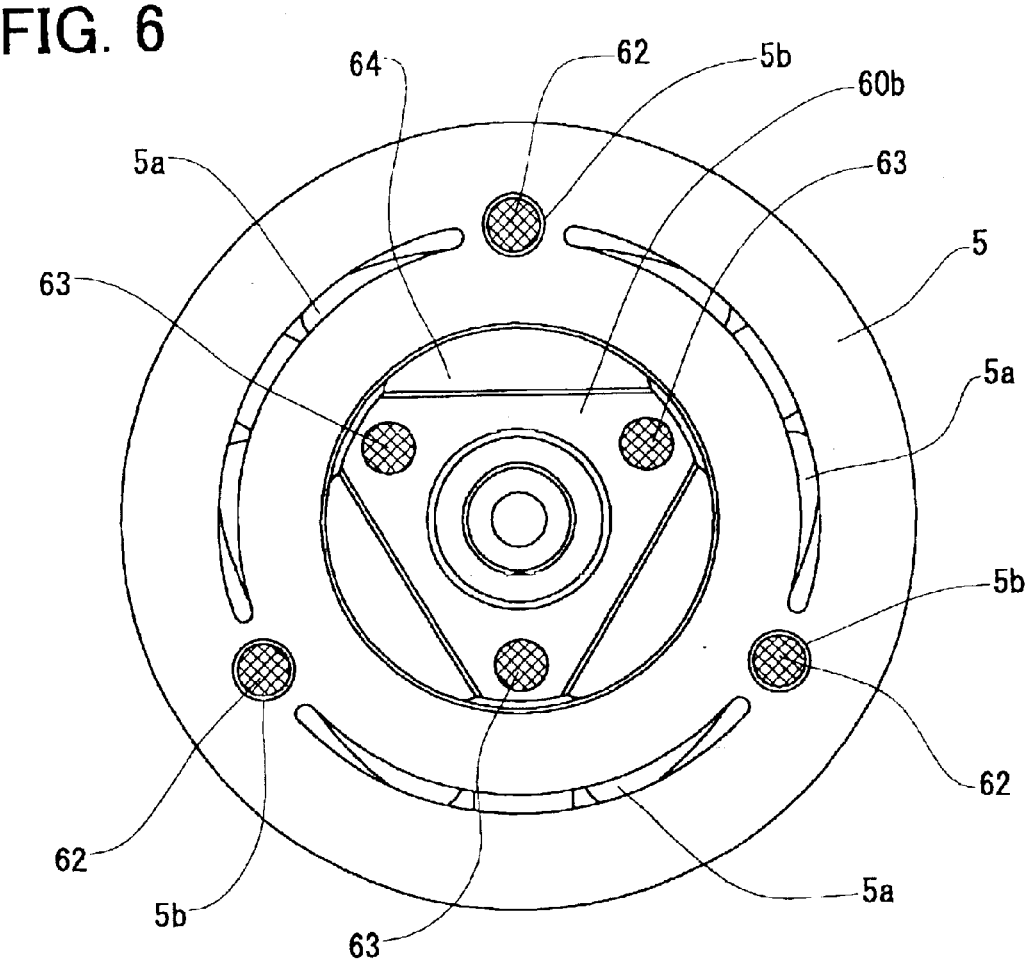
FIG. 6 is a rear view of the hub viewed from right side in FIG. 4.
Figure 7A:
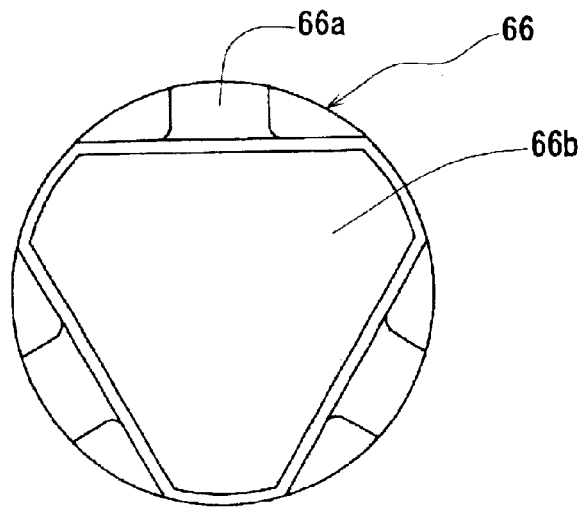
FIG. 7A is a front view showing the shape of a second elastic member 66.
Figure 7B:
FIG. 7B is a side view of FIG. 7A according to the first embodiment of the present invention.
Figure 8:
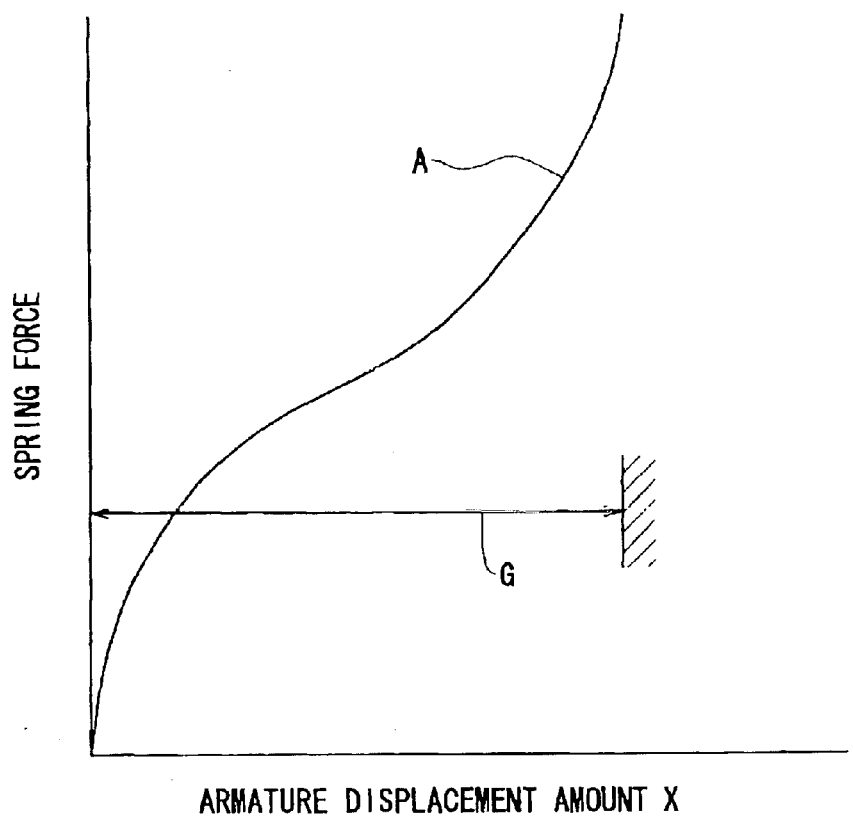
FIG. 8 is a characteristic curve showing a relation between the spring force of the leaf spring 61 and a displacement amount X of the armature according to the first embodiment of the present invention.

FIG. 4 is a longitudinal cross-sectional view of a hub 6 of the electromagnetic clutch 1 shown in FIG. 1. FIG. 5 is a front view showing a simplified shape of a leaf spring 61 shown in FIG. 4, and FIG. 6 is a rear view of the hub 6 viewed from a right side in FIG. 4. FIGS. 7A and 7B include front and side views showing a shape of a second elastic member 66 which is a main portion of the present invention.

The electromagnetic clutch 1, as shown in FIG. 1, includes an electromagnetic coil 3 accommodated inside the stator 2, a rotor 4, which is a drive-side rotation member, driven by an automobile engine (not shown) functioning as a driving source, an armature 5 attracted to the rotor 4 by a magnetic force generated by the electromagnetic coil 3, and the hub 6, which is a driven-side rotation member, connected to the armature 5 and rotating together with the armature 5. The hub 6 is connected to a drive shaft 8 of the refrigerant compressor 7, which is a driven-side device, to transmit rotational power to the refrigerant compressor 7.

The electromagnetic coil 3 is wound around a resin spool 3a, and is accommodated in the stator 2 with a U-shaped cross section made of a magnetic material such as iron, and is fixed inside the stator 2 by molding an electrical insulation resin such as epoxy resin. The stator 2 is fixed to a housing 10 of the refrigerant compressor 7 via a ring-shaped support member 9 (see FIGS. 1 and 3).

The rotor 4 has a pulley 4a which is engaged with a multi-stage V-belt (not illustrated) on its outer periphery, and is rotated by the rotational power of the engine transmitted through the V-belt. The rotor 4 is made of a magnetic material such as iron, and has a U-shaped cross section to accommodate the stator 2 while maintaining a small gap between the stator 2 and the rotor 4 itself. The rotor 4 also has a bearing 11 on an inner periphery thereof. The bearing 11 rotatably supports the rotor 4 on an outer peripheral surface of a cylindrical boss 10a of the housing 10 of the refrigerant compressor 7.

The armature 5, which may be made of a magnetic material such as iron into a ring-shape (refer to FIG. 6), is disposed in a direction opposite to a friction surface 4b of the rotor 4 while maintaining a predetermined small gap (0.5 mm, for example). The armature 5 of this embodiment is integrally formed with three grooves 5a with a predetermined width disposed in the nearly middle of a width of the armature 5 in a radial direction, and three rivet holes 5b disposed in a circumferential direction to be coupled to the leaf spring 6, which will be described later. Therefore, a displacement amount of the armature 5 in an axial direction, which is produced by attraction to and separation from the rotor 4, is evenly transmitted to the leaf spring 6.

Now describing details of the hub 6 based on FIG. 4, the hub 6 includes a cylindrical inner hub 60 made of metal from the iron family. A spline fit portion 60a formed in an inner periphery of a cylindrical portion of the inner hub 60 integrally fits the drive shaft 8 in a rotational direction. The inner hub 60 has an integrally formed attachment flange 60b which outwardly extends from an axial end of the cylindrical portion of the inner hub 60 (from a tip side of the drive shaft 8) in a radial direction, and has an approximate hexagonal outside shape shown by dashed lines "a" in FIG. 2.

A plate or polygonal-shaped leaf spring 61 is used for connecting the armature 5 to the inner hub 60. The leaf spring 61 is normally pressed steel and made of an elastic metal including iron, such as SK5 or S65CM, or an elastic metal including nonmagnetic stainless steel (austenitic stainless steel family), and has a thickness of about 0.6 mm.

The leaf spring 61 of the present embodiment, as shown in FIG. 5, comprises a center hole 61a, an approximate triangle-shaped attachment portion 61b formed on the outer peripheral side of the center hole 61a, an outer ring portion 61c, and three connecting portions 61d which connect the outer ring portion 61c to tips of the attachment portion 61b positioned inside the outer ring portion 61c in the circumferential direction. The whole leaf spring 61 is formed in an approximate nonagonal shape with the connecting portions 61d having the largest radius.

Also three arm portions 61e protrude from the smallest radial portions of the outer ring portion 61c along the circumferential direction. Rivet holes 61f are provided on basal portion sides of the arm portions 61e in the outer ring portion 61c. The rivet holes 61f are used for connecting the outer ring portion 61c of the leaf spring 61 to the armature 5, since the rivets 62 penetrate through the rivet holes 61f and the above-mentioned rivet holes 5b. The rivet holes 61f are lock portions of the present invention. A length from the rivet hole 61f to an end of the arm portion 61e is shorter than a predetermined length, so that the arm portions 61e exert their spring force toward the armature 5 side in an axial direction during the attraction of the armature to the rotor 4.

Three rivet holes 61g are provided in the attachment portion 61b at positions which are shifted approximately 60 degrees from the rivet holes 61f in the circumferential direction. The rivet holes 61g connect the leaf spring 1 to the hub 6, and rivets 63 together fix the attachment portion 61b onto the attachment flange 60b of the inner hub 60.

In the leaf spring 61, two fitting holes 61h for securing first elastic members 67 (also known as rubber dampers 67)

disposed between the armature 5 and the leaf spring 61 are provided in each of three portions across the connecting portions 61d and the outer ring portion 61c along the circumferential direction. The first elastic members 67, as shown in FIGS. 1 and 2, are made of an elastic material such as rubber formed in an elliptic shape extending in a radial direction, and are disposed between the armature 5 and the leaf spring 61 with the following two functions.

First, since the first elastic members 67 are so positioned at intermediate points of multiple armature securing portions (the rivets 62 and the arm portions 61e) in the circumferential direction of the leaf spring 61 as to be adjacent to the armature 5, the outer ring portion 61c is elastically deformed in the circumferential and axial directions by the same distance as a thickness of the first elastic member 67. Consequently, an initial deflection given to the leaf spring 61 generates a spring force of the leaf spring 61 in a direction of separating the armature 5 from the rotor 4, so that it is possible to retain the armature 5 at a predetermined separate position by the generated spring force when the clutch is OFF. In other words, the first elastic members 67 function as deflection generating portions which give the initial deflection to the leaf spring 61.

Second, when the clutch is OFF (when the armature 5 is separated from the friction surface 4b of the rotor 4 as shown in FIG. 1) and the armature 5 rapidly returns to an original position, the first elastic member 67 alleviates an impact produced by collision between the armature 5 and the leaf spring 61, so that the first elastic member 67 reduces collision noises, namely clutch operating noises.

An axial position of the armature 5 is always held and restricted in a predetermined area regardless of the axial displacement of the armature 5 (ON and OFF of the clutch). This is so because a distance between a position where the first elastic member 67 collides against the armature 5 and the attachment flange 60b of the inner hub 60 is small, especially in an inner side portion, that is, a portion near the rivet 63.

The leaf spring 61 performs its spring function by elastically deforming the outer ring portion 61c, in which securing portions of rivets 62 are positioned as well as the connecting portions 61d. In this embodiment, the outer ring portion 61c is positioned on an outer side of the leaf spring 61 to create a large perimeter, so that distances between fulcrums of the springs (spans) become large. Therefore, it becomes possible to reduce the spring force which is necessary to displace the armature 5 by a predetermined amount in the axial direction in order to save an electromagnetic force.

A second elastic member 66 is provided between an outer end of the attachment flange 60b of the hub 6 and an inner periphery of the armature 5. The second elastic member 66 is formed to be fitted on a supporting member 64 which covers an end surface and the outer end of the attachment flange 60b.

As shown in FIGS. 7A and 7B, an outside shape of the second elastic member 66 is approximately round. The second elastic member 66 has a fitting portion 66b formed inside in the same shape as the approximate hexagonal outer end of the attachment flange 60b, and three approximate D-shaped elastic portions 66a integrally formed with the fitting portion 66b in the circumferential direction.

The second elastic member 66 is provided between the outer end of the attachment flange 60b and the inner periphery of the armature 5 by means of fitting the approximate D-shaped elastic portions 66a on the supporting member 64 while the elastic portions 66a of the second elastic member 66 collide with the arm portions 61e of the leaf spring 61. Accordingly, when the clutch is ON and the armature 5 is attracted to the rotor 4 by the electromagnetic force of the electromagnetic coils 3, the arm portions 61e of the leaf spring 61 are displaced to a rotor 4 side in the axial direction together with the armature 5, though an axial position of the hub 6 is unchanged. Thus, the second elastic member 66 is elastically compressed between the tips of the arm portions 61e and the supporting portion 64, with an increase in a displacement amount of the arm portions 61e.

Consequently, an elastic reaction force is generated on the second elastic member 66, and the elastic reaction force becomes large rapidly just moments before the armature 5 is attracted to the rotor 4. The rapid increase in the elastic reaction force of the second elastic member 2 alleviates the impact caused by attraction of the armature 5 to the friction surface 4b of the rotor 4, so that the clutch operating noise is further reduced.

A ring portion 60c, which further inwardly protrudes from the inner surface of the cylindrical portion, is formed in the inner periphery of the attachment flange 60b of the inner hub 60. The hub 6 (the inner hub 60) is integrally connected to the drive shaft 8 by fixing the ring portion 60c to the tip of the drive shaft 8 by a bolt 65.

Operations of the electromagnetic clutch 1 according to the first embodiment having the above-described structure will now be described. When the electromagnetic coil 3 is not energized (that is, when the clutch is OFF), as is described above, the initial deflection is given to the outer ring portion 61c of the leaf spring 61 because of the thickness of the first elastic members 67. Thus, the armature 5 is retained at a separate position from the friction surface 4b of the rotor 4 with a predetermined space, by the spring force caused by the initial deflection.

Accordingly, the rotational power generated by the automobile engine (not shown) is simply transmitted to the rotor 4 via the V-belt, not transmitted to the armature 5 and the hub 6, so that only the rotor 4 rotates on the bearing 11 in an idling state. As a result, the refrigerant compressor 7 is stopped. When the electromagnetic coil 3 is energized, the electromagnetic force generated by the electromagnetic coil 3 attracts the armature 5 to the rotor 4 against the spring force of the leaf spring 61, and the armature 5 is attracted to the friction surface 4b of the rotor 4. Then, rotation of the rotor 4 is transmitted to the drive shaft 8 of the refrigerant compressor 7 via the armature 5, the leaf spring 61, and the inner hub 60. As a result, the refrigerant compressor 7 is actuated.

When the energization of the electromagnetic coil 3 is stopped, the armature 5 returns to the original separate position by the spring force of the leaf spring 61 because of the disappearance of the electromagnetic force, so that the refrigerant compressor 7 returns to a stop condition. During an attraction process of the armature 5 to the friction surface 4b of the rotor 4 by the electromagnetic force generated by the electromagnetic coil 3, it is necessary to deform the outer ring portion 61b of the spring 61 in both the axial and circumferential directions. Therefore, the relation between the spring force of the leaf spring 61 and the displacement amount of the armature 5 in the present embodiment possesses characteristic A shown in FIG. 8, for example, in which when displacement amount X of the armature 5 increases and approaches a size of an attraction gap G, the spring force of the leaf spring 61 nonlinearly and rapidly increases.

Accordingly, in this embodiment movement of the armature is restricted just before the armature 5 collides with the friction surface 4b of the rotor 4. In other words, the arm portions 61e of the leaf spring 61 compress the second elastic member 66 just before the armature 5 collides with the friction surface 4b of the rotor 4 in order to alleviate the collision noise generated.

Restricting a length from the tip of the arm portion 61e for compressing the second elastic member 66 to the securing portion thereof determines the alleviation of the collision noise. When the length is longer than a predetermined one, there is little alleviation effect because distortion of the arm portions 61e increases and a compressive force to the second elastic member 66 decreases. Therefore, the length between the tip of the arm portion 61e and the securing portion has to be restricted within the predetermined length in order to ensure the predetermined compressive force. When current to the electromagnetic coil 3 is interrupted and the armature 5 returns to the original separate position by the spring force of the leaf spring 61, the armature 5 collides with the first elastic members 67 to determine the axial position, so that the clutch operating noise generated then is also reduced.

According to the electromagnetic clutch 1 of the first embodiment described above, because the arm portions 61e for compressing the second elastic member 66 are formed in the vicinity of the plural securing portions 62 which connect the leaf spring 61 to the armature 5, the spring force is securely transmitted from the securing portions 62 to the arm portions 61e and the compressive force to compress the second elastic member 66 increases, when the clutch is ON. This reduces any clutch operating noise. The operating noise when the clutch is OFF is also reduced because the armature 5 collides with the first elastic members 67 and determines its axial position.

Also the leaf spring 61 is so formed in a nonagonal shape such that the perimeter of the outer ring portion 61c, which is connected to the connecting portions 61d, becomes the largest. Thus, the outer ring portion 61c with a spring function has the large perimeter and the distances between the fulcrums of the springs (spans) become large. Thus, it is possible to reduce the spring force which is necessary to displace the armature 5 by a predetermined amount.

The length from the securing portion 62 to the tip of the arm portion 61e is restricted within the predetermined length in order to reduce the clutch operating noise, because if the length exceeds the predetermined length, for example, the distortion of the arm portion 61e increases and the compressive force is not properly exerted. The second elastic member 66 is provided with three integrally-formed approximately D-shaped elastic portions 66a which are opposed to the above-mentioned arm portions 61e. Accordingly, reduction in the number of parts and in the number of man-hours for the attachment processes produces reductions in cost.

(Second Embodiment)

Figure 9A:
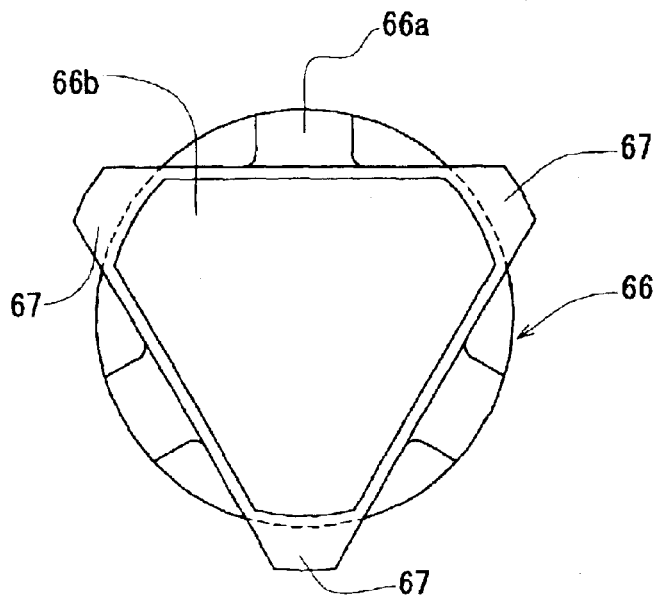
FIG. 9A is a front view showing the shape of the second elastic member 66.
Figure 9B:
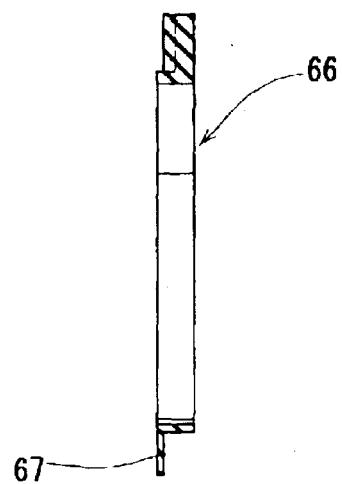
FIG. 9B is a side view thereof according to the second embodiment of the present invention.

In the above first embodiment, the first elastic members 67 and the second elastic members 66 are separate components, but the first elastic members 67 may be formed integrally with the second elastic members 66. A second embodiment will be described with reference to FIGS. 9 to 11. Referring to FIGS. 9A and 9B, the second elastic member 66 according to the second embodiment is provided with three integrally formed projective portions 67 which are disposed in intermediate points between the D-shaped elastic members 66a in the circumferential direction of the second elastic member 66, and extend outwardly in the radial direction.

Figure 10:
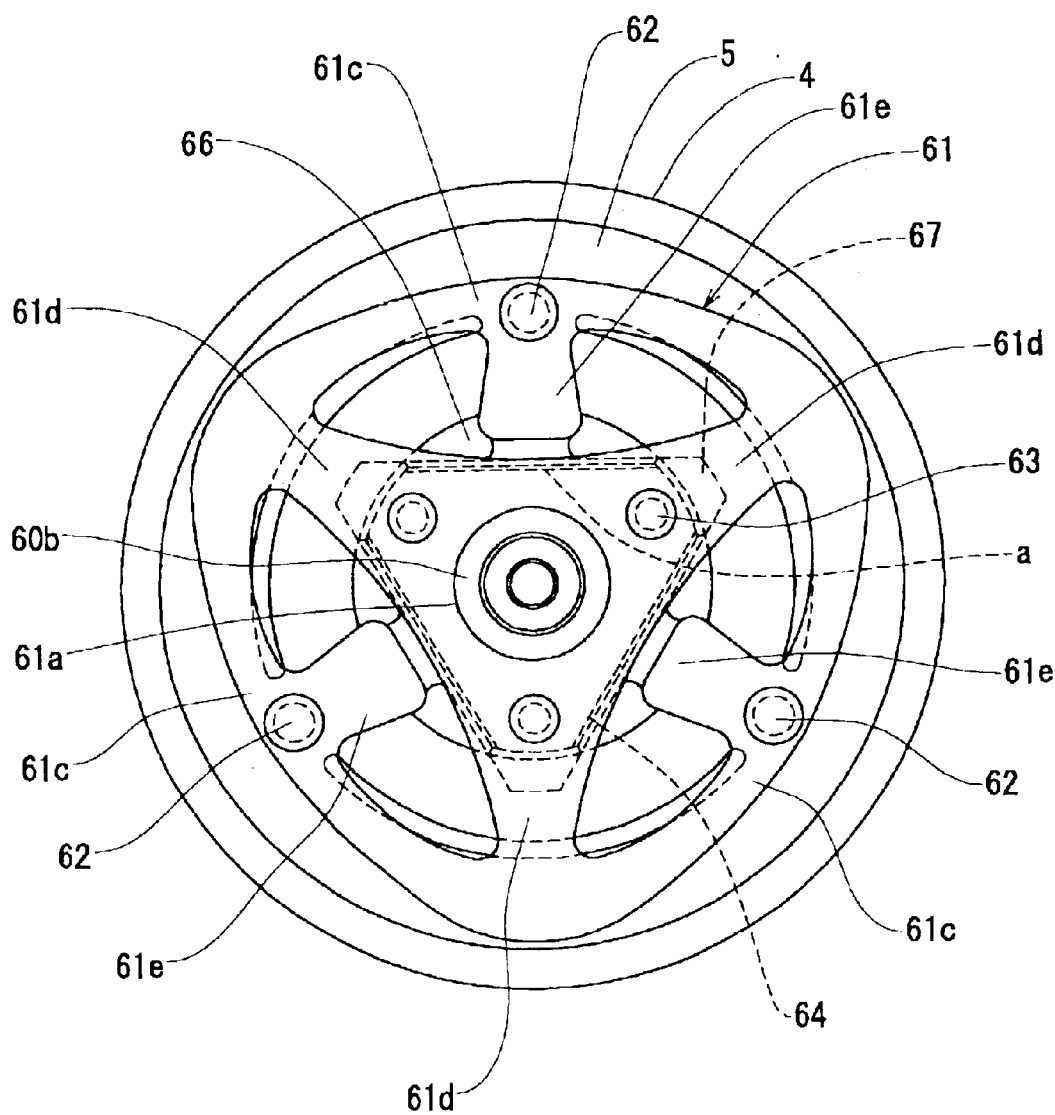
FIG. 10 is a front view showing the configuration of the electromagnetic clutch 1 according to the second embodiment of the present invention.
Figure 11:
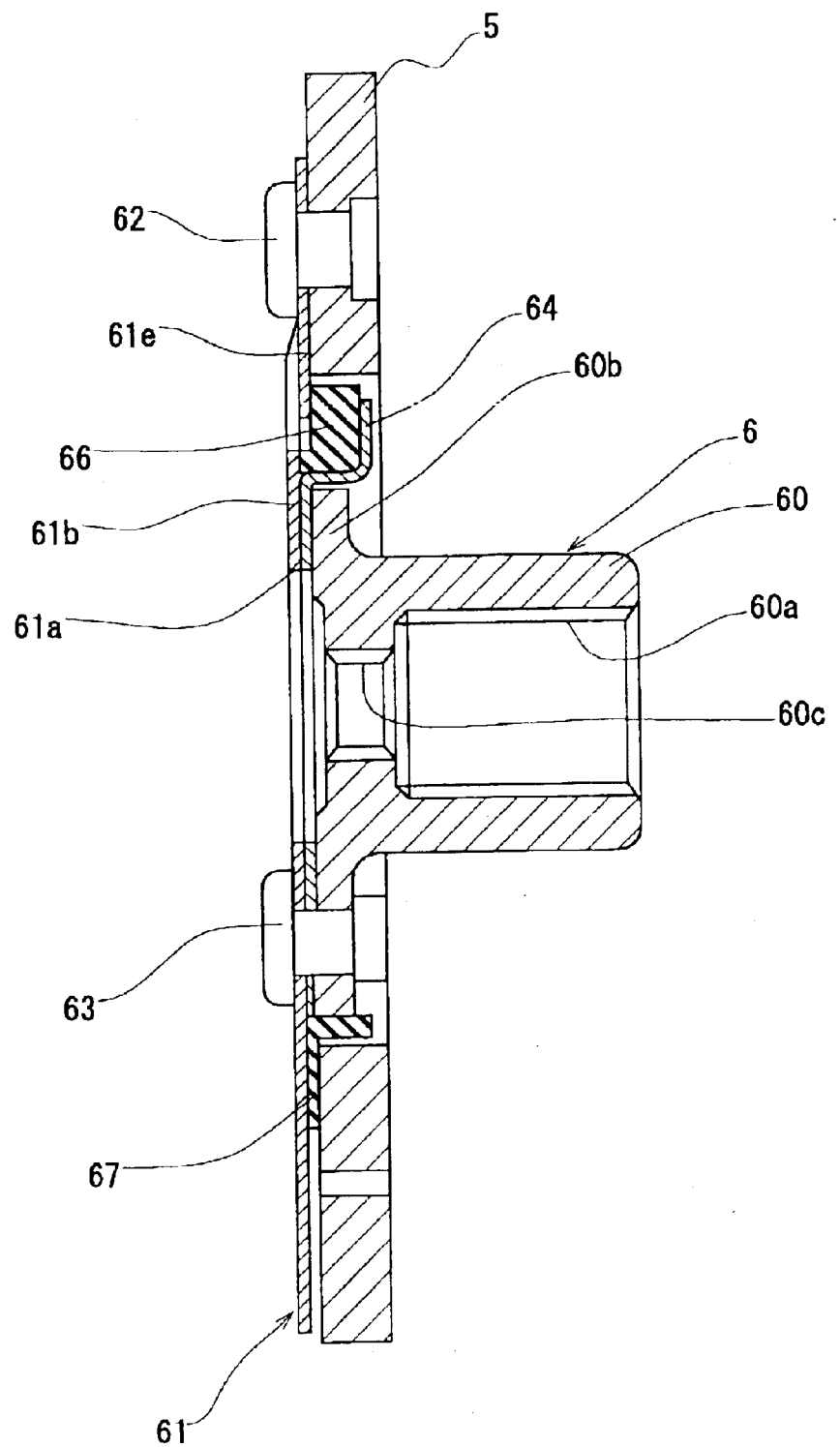
FIG. 11 is a longitudinal cross-sectional view showing the entire configuration of the hub shown in FIG. 10.

These projective portions 67, as shown in FIGS. 10 and 11, are disposed between the armature 5 and the leaf spring 61, and at intermediate points between securing portions 62 to give initial deflection to the leaf spring 61 which corresponds to the first elastic members 67 of the first embodiment. Therefore, reduction in the number of parts and improvement in assembling performance result in cost reductions.

Figure 12:
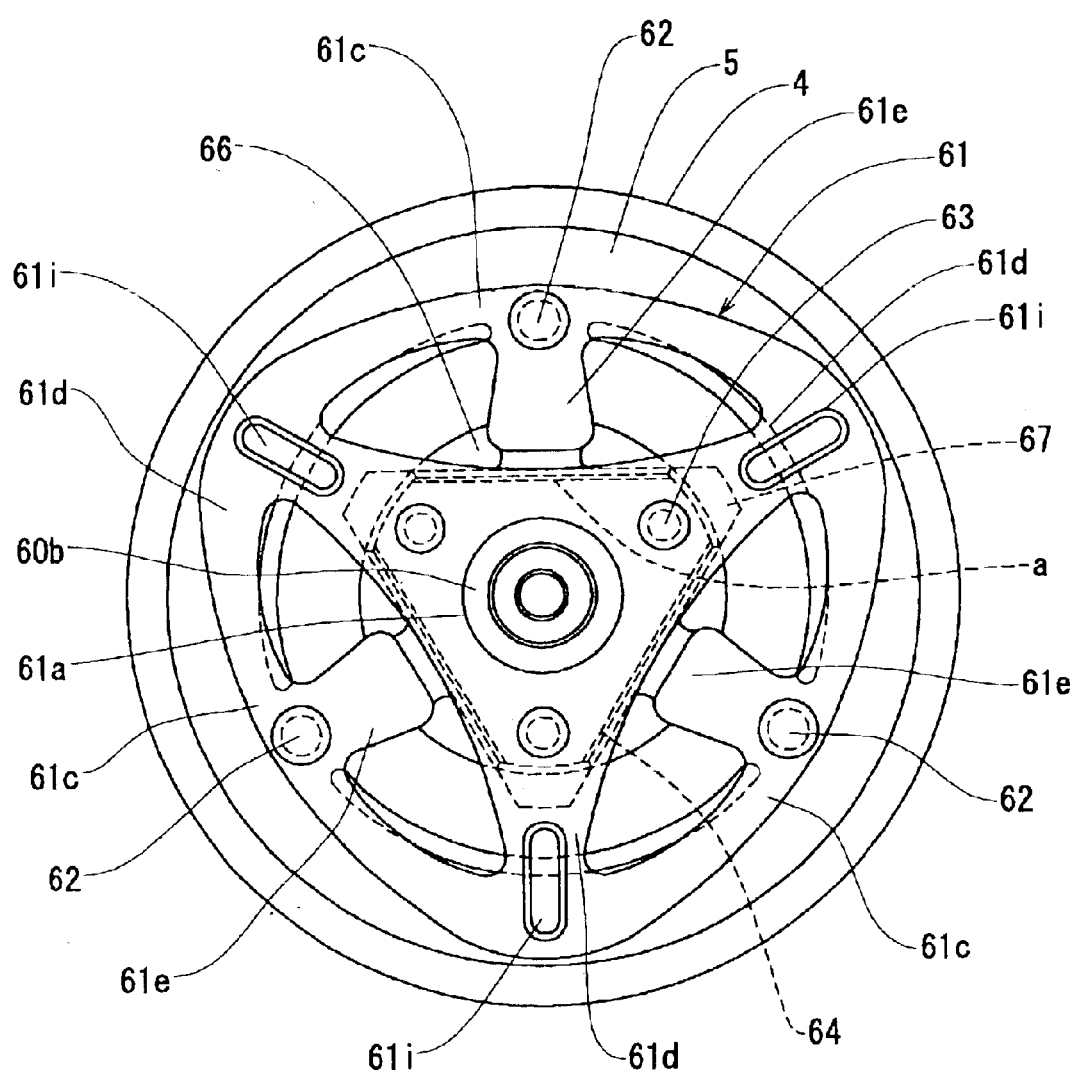
FIG. 12 is a front view showing the configuration of the electromagnetic clutch 1 according to the second embodiment of the present invention.

Referring to FIGS. 12 and 13, embossed portions 61i which are in an elliptic shape extending in the radial direction may be provided in three positions between the connecting portions 61d and the outer ring portions 61c of the leaf spring 61. The embossed portions 61i are formed by pressing them from a reference surface of the leaf spring 61 toward the armature 5 such that there is a predetermined height (for example, approximately 0.8). The embossed portions 61i function as the deflection generating portions to give the initial deflection, as being described in the first embodiment.

(Another Embodiment)

In the above embodiments, the second elastic member 66 is fitted in the supporting member 64 which covers the end surface and the outer end of the attachment flange 60b, but the second elastic member 66 may be directly fitted in the attachment flange 60b without providing the supporting member 64. As shown in FIG. 14, D-shaped notches 60d to fit the D-shaped elastic portions 66a of the second elastic members 66 are formed in the attachment flange 60b of the hub 6, and a D-shaped back plate portion 60e is formed inside the notches 60d in the axial direction. Accordingly, because the supporting member 64, which is a separate part in the first and second embodiments, is integrally formed in the hub 6, reduction in the number of the parts results in a cost reduction.

In the above embodiments, the leaf spring 61 is approximately nonagonal in shape, but the leaf spring 61 may be a polygon such as approximately triangular or approximately hexagonal in shape.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electromagnetic clutch comprising:
   an electromagnetic coil for generating an electromagnetic force when being energized;
   a drive-side rotation member rotated by a driving source;
   an armature attracted to said drive-side rotation member in response to the electromagnetic force generated by said electromagnetic coil to receive rotation of said drive-side rotation member;
   a driven-side rotation member connected to a driven-side device; and
   a spring means which couples said armature to said driven-side rotation member and supports said armature such that said armature is capable of being displaced toward said drive-side rotation member, wherein
   said spring means is a plate of polygonal leaf spring, said leaf spring comprising:
      an outer ring portion connected to said armature;
      an attachment portion positioned inside said outer ring portion and connected to said driven-side rotation member;
      a plurality of connecting portions between said outer ring portion and said attachment portion;
      a plurality of securing portions of said armature disposed in a circumferential direction of said outer ring portion;

a plurality of first elastic members disposed at intermediate points of said plurality of securing portions in the circumferential direction of said outer ring portion to give an initial deflection to said leaf spring; and a second elastic member disposed between said leaf spring and said drive-side rotation member in an axial direction, wherein said second elastic member is elastically deformed between said leaf spring and said driven-side rotation member when the electromagnetic force generated by said electromagnetic coil displaces said armature toward said drive-side rotation member in an axial direction; and wherein said armature collides with said plurality of first elastic members to determine its axial position when said electromagnetic coil is unenergized and said armature is separated from said drive-side rotation member to return to an original position.

2. The electromagnetic clutch according to claim 1, wherein said leaf spring, has said attachment portion formed in approximately a triangular shape, and has said connecting portions in the vicinity of the apexes of said triangular shape to connect with said outer ring portion, and said outer ring portion connected to said connecting portions is so formed in a polygonal shape.

3. The electromagnetic clutch according to claim 2, wherein said leaf spring is provided with arm portions inwardly extending from said outer ring portion adjacent to said plurality of securing portions, and said second elastic member is able to elastically deform between said arm portions and said driven-side rotation member.

4. The electromagnetic clutch according to claim 3, wherein each distance of said arm portions from said securing portions to a tip of said arm portions is shorter than a predetermined length.

5. The electromagnetic clutch according to claim 1, wherein said armature is formed in an approximate ring shape, and said plurality of securing portions are disposed approximately at a center of a radial width of said armature.

6. The electromagnetic clutch according to claim 3, wherein said second elastic member with a plurality of approximate D-shaped elastic portions is integrally formed to fit in an outer periphery of said attachment portion, and said second elastic member is disposed between said arm portions and said driven-side rotation member and is elastically deformable.

7. The electromagnetic clutch according to claim 6, wherein said second elastic member is integrally formed with said plurality of first elastic members which are disposed at intermediate points of said second elastic member in a circumferential direction and provide an initial deflection to said leaf spring.

8. The electromagnetic clutch according to claim 1, wherein said leaf spring is provided with arm portions inwardly extending from said outer ring portion adjacent said plurality of securing portions, and said second elastic member is elastically deformable between said arm portions and said driven-side rotation member.

9. An electromagnetic clutch comprising:

an electromagnetic coil generating an electromagnetic force when energized;

a drive-side rotation member rotated by a driving source;

an armature attracted to the drive-side rotation member in response to the electromagnetic force generated by the electromagnetic coil to receive rotation of the drive-side rotation member;

a driven-side rotation member connected to a driven-side device; and a spring coupling the armature to the driven-side rotation member and supporting the armature such that the armature is capable of being displaced toward the drive-side rotation member, wherein the spring includes a polygonal leaf spring comprising:

an outer ring portion connected to the armature;

an attachment portion positioned inside the outer ring portion and connected to the driven-side rotation member;

a plurality of connecting portions between the outer ring portion and the attachment portion;

a plurality of securing portions of the armature disposed in a circumferential direction of the outer ring portion;

a plurality of first elastic members disposed at intermediate points of the plurality of securing portions in the circumferential direction of the outer ring portion to provide an initial deflection to the polygonal leaf spring; and a second elastic member disposed between the polygonal leaf spring and the drive-side rotation member in an axial direction, wherein the second elastic member is elastically deformed between the polygonal leaf spring and the driven-side rotation member when the electromagnetic force generated by the electromagnetic coil displaces the armature toward the drive-side rotation member in an axial direction; and wherein, when the electromagnetic coil is de-energized and the armature is separated from the drive-side rotation member to return to an original position by a spring force of the polygonal leaf spring, the armature collides with the plurality of first elastic members to determine an axial position of the armature.

10. The electromagnetic clutch according to claim 9, wherein:

the attachment portion of the polygonal leaf spring is formed in approximately a triangular shape, the connecting portions are located in the vicinity of apexes of the triangular shape so as to connect with the outer ring portion, and the outer ring portion connected to the connecting portions are formed in a polygonal shape.

11. The electromagnetic clutch according to claim 10, wherein the polygonal leaf spring further includes a plurality of arm portions extending inwardly from the outer ring portion adjacent to the plurality of securing portions, and the second elastic member is capable of elastically deforming between the plurality of arm portions and the driven-side rotation member.

12. The electromagnetic clutch according to claim 11, wherein each of a plurality of distances associated with the plurality of arm portions from the plurality of securing portions to a tip of each of the plurality of arm portions is shorter than a predetermined length.

13. The electromagnetic clutch according to claim 9, wherein:

the armature is formed in an approximate ring shape, and the plurality of securing portions are disposed approximately at a center of a radial width of the armature.

14. The electromagnetic clutch according to claim 11, wherein:

the second elastic member includes a plurality of approximate D-shaped elastic portions and is integrally formed to fit in an outer periphery of the attachment portion, and the second elastic member is disposed between the plurality of arm portions and the driven-side rotation member and is elastically deformable.

15. The electromagnetic clutch according to claim 14, wherein the second elastic member is integrally formed with the plurality of first elastic members disposed at intermediate points thereof in a circumferential direction of the second elastic member to provide an initial deflection to the polygonal leaf spring.

16. The electromagnetic clutch according to claim 9, wherein:

the polygonal leaf spring further includes a plurality of arm portions extending inwardly from the outer ring portion adjacent the plurality of securing portions, and the second elastic member is elastically deformable between the plurality of arm portions and the driven-side rotation member.

* * * * *